United States Patent
Chang et al.

(10) Patent No.: US 9,983,735 B2
(45) Date of Patent: May 29, 2018

(54) TOUCH SYSTEM AND TOUCH DETECTION METHOD

(71) Applicant: AU Optronics Corporation, Hsin-Chu (TW)

(72) Inventors: Li-Wei Chang, Hsin-Chu (TW); Yung-Chih Wu, Hsin-Chu (TW); Wei-Ting Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 409 days.

(21) Appl. No.: 14/720,151

(22) Filed: May 22, 2015

(65) Prior Publication Data
US 2016/0154491 A1 Jun. 2, 2016

(30) Foreign Application Priority Data

Dec. 2, 2014 (TW) .............................. 103141812 A

(51) Int. Cl.
| | |
|---|---|
| *G06F 3/042* | (2006.01) |
| *G06F 3/041* | (2006.01) |
| *G06F 3/044* | (2006.01) |
| *G06F 3/0488* | (2013.01) |
| *G06F 3/038* | (2013.01) |
| *G02F 1/1333* | (2006.01) |

(52) U.S. Cl.
CPC ............ *G06F 3/0421* (2013.01); *G06F 3/038* (2013.01); *G06F 3/044* (2013.01); *G06F 3/0428* (2013.01); *G06F 3/0488* (2013.01); *G02F 1/13338* (2013.01); *G06F 2203/04104* (2013.01); *G06F 2203/04106* (2013.01); *G06F 2203/04808* (2013.01)

(58) Field of Classification Search
CPC .... G06F 3/0416; G06F 3/0421; G06F 3/0428; G06F 3/042; G06F 2203/04104; G06F 3/041; G06F 3/044; G06F 3/0488; G06F 2203/04106; G06F 2203/04808; G02F 1/13338; G02F 1/133615
See application file for complete search history.

(56) References Cited

U.S. PATENT DOCUMENTS

| | | | | |
|---|---|---|---|---|
| 6,507,311 B2 * | 1/2003 | Sauer | ...................... | G01S 13/34 |
| | | | | 180/169 |
| 7,580,007 B2 * | 8/2009 | Brown | ............... | G02B 26/0816 |
| | | | | 345/15 |

(Continued)

FOREIGN PATENT DOCUMENTS

| | | |
|---|---|---|
| CN | 102419661 A | 4/2012 |
| TW | 200912718 A | 3/2009 |

(Continued)

*Primary Examiner* — Dismery Mercedes
(74) *Attorney, Agent, or Firm* — WPAT, PC

(57) ABSTRACT

A touch system is disclosed herein. The touch system includes detecting units and a control unit. The detecting units are disposed around a detecting area, and form a plurality of scan lines therebetween. The control unit is configured to detect first crossing points according to a transmission status of each of the scan lines, to delete ghost points of the first crossing points according to a first scan line having a first slope value of the scan lines to generate second crossing points, and to divide the second crossing points into groups to output touch points.

18 Claims, 10 Drawing Sheets

(56) References Cited

U.S. PATENT DOCUMENTS

| | | | | |
|---|---|---|---|---|
| 7,982,723 B2* | 7/2011 | Ningrat | ............... | G06F 3/044 345/174 |
| 8,179,408 B2* | 5/2012 | Chen | ............... | G06F 3/044 347/174 |
| 8,350,826 B2* | 1/2013 | Watanabe | ............... | G06F 3/0418 324/658 |
| 8,427,444 B2* | 4/2013 | Wu | ............... | G06F 3/0418 345/173 |
| 8,576,200 B2* | 11/2013 | Zhu | ............... | G06F 3/038 345/175 |
| 8,816,986 B1* | 8/2014 | Park | ............... | G06F 3/044 345/173 |
| 9,024,896 B2* | 5/2015 | Chen | ............... | G06F 3/0416 345/173 |
| 9,134,854 B2* | 9/2015 | Wassvik | ............... | G06F 3/0421 |
| 9,235,293 B2* | 1/2016 | Chang | ............... | G06F 3/0416 |
| 9,292,132 B2* | 3/2016 | An | ............... | G06F 3/0416 |
| 9,632,641 B2* | 4/2017 | Liu | ............... | G06F 3/044 |
| 2009/0066662 A1 | 3/2009 | Liu et al. | | |
| 2010/0045629 A1 | 2/2010 | Newton | | |
| 2011/0026038 A1 | 2/2011 | Kiyose | | |
| 2011/0157096 A1* | 6/2011 | Drumm | ............... | G06F 3/0421 345/175 |
| 2011/0261016 A1 | 10/2011 | Huang | | |
| 2011/0316814 A1 | 12/2011 | Kao et al. | | |
| 2012/0105351 A1* | 5/2012 | Yang | ............... | G06F 3/04845 345/173 |
| 2012/0162136 A1 | 6/2012 | Chen et al. | | |
| 2012/0299879 A1 | 11/2012 | Kim | | |
| 2013/0027357 A1* | 1/2013 | Liu | ............... | G06F 3/042 345/175 |
| 2013/0038577 A1* | 2/2013 | Chen | ............... | G06F 3/042 345/175 |
| 2014/0320459 A1* | 10/2014 | Pettersson | ............... | G06F 3/0416 345/175 |
| 2015/0042582 A1* | 2/2015 | An | ............... | G06F 3/0421 345/173 |

FOREIGN PATENT DOCUMENTS

| | | |
|---|---|---|
| TW | 201106230 | 2/2011 |
| TW | 201113778 | 4/2011 |
| TW | 201128479 | 8/2011 |
| TW | 201435685 A | 9/2014 |

* cited by examiner

TOUCH SYSTEM AND TOUCH DETECTION METHOD

This application claims priority to Taiwan Application Serial Number, 103141812, filed Dec. 2, 2014, which is herein incorporated by reference.

BACKGROUND

Technical Field

The present disclosure relates to a touch system. More particularly, the present disclosure relates to a touch system and a touch detection method having an operation of deleting ghost points.

Description of Related Art

More and more electronic products adopt touch operations to provide much intuitive and convenient operation methods to user. Typical touch operations include optical touch, capacitive touch, acoustic wave touch, etc.

In the application of the optical touch operations, ghost points may be generated in the touch operations, which may lead to inaccurate or incorrect results of operation.

To address the aforementioned issue, additional optical transceivers are arranged in some applications to generate optical scan lines with more various angles. However, such arrangement significantly increases the computational complexity and data handling capacity, and thus reduces the responding rate of the touch operations.

SUMMARY

An aspect of the present disclosure is to provide a touch system. The touch system includes detecting units and a control unit. The detecting units are disposed around a detecting area, and form a plurality of scan lines therebetween. The control unit is configured to detect first crossing points according to a transmission status of each of the scan lines, to delete ghost points of the first crossing points according to a first scan line having a first slope value of the scan lines to generate second crossing points, and to divide the second crossing points into groups to output touch points.

Another aspect of the present disclosure is to provide a touch detection method, which includes the operations as follows: detecting first crossing points on a detecting area according to a transmission status of each of scan lines; deleting ghost points of the first crossing points according to a first scan line having a first slope value of the scan lines, so as to generate second crossing points; and dividing the second crossing points into groups, so as to output a touch points.

In summary, the touch system and the touch detection method of the present disclosure are able to have multiple arrangements, and to significantly improve the accuracy of the touch operation by deleting ghost points.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following description of the embodiment, with reference made to the accompanying drawings as follows.

DETAILED DESCRIPTION

Figure 1:
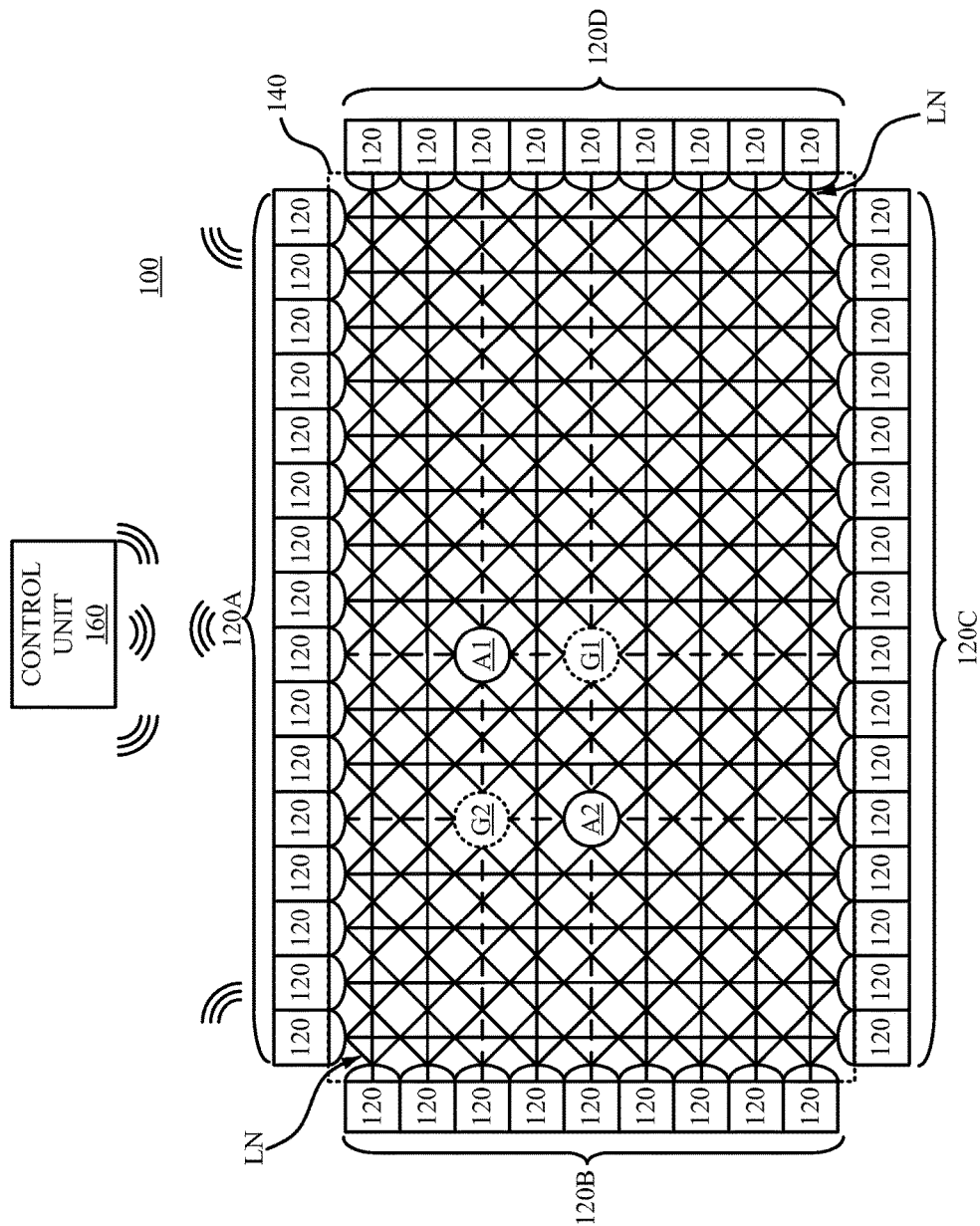
FIG. 1 is a schematic diagram of a touch system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the term "coupled" may also be termed as "electrically coupled," and the term "connected" may be termed as "electrically connected." "Coupled" and "connected" may also be used to indicate that two or more elements cooperate or interact with each other.

Reference is now made to FIG. 1. FIG. 1 is a schematic diagram of a touch system according to one embodiment of the present disclosure. As shown in FIG. 1, the touch system 100 includes detecting units 120, a detecting area 140, and a control unit 160.

The detecting units 120 are configured to be disposed adjacent with each other and around the detecting area 140, and to transmit a physical signal to the detecting unit 120 at a corresponding position. As a result, scan lines LN are formed. In some embodiments, each of the detecting units 120 is an optical transceiver, e.g., an infrared ray transceiver. Thus, the detecting units 120 are able to transmit detecting lights, e.g., an infrared ray signal, to each other, so as to form the scan lines LN. Alternatively, in some other embodiments, as shown in FIG. 1, the detecting units 120 are divided into a first group 120A, a second group 120B, a third group 120C, and a fourth group 120D. The first group 120A is disposed at an upper side of the detecting area 140. The second group 120B is disposed at a left side of the detecting area 140. The third group 120C is disposed at right side of the detecting area 140. The fourth group 120D is disposed at lower side of the detecting area 140. In this embodiment, the detecting units 120 of the first group 120A and the detecting units 120 of the second group 120B may be light-emitting units (e.g., infrared ray transmitters), and the detecting units 120 of the third group 120C and the detecting units 120 of the fourth group 120D may be light receiving units (e.g., infrared ray receivers). With such arrangement, the first group 120A and the second group 120B are able to emit detecting lights, e.g., the infrared ray signals, respectively, toward the third group 120C and the fourth group 120B along different directions, so as to form the scan lines LN. In other words, in FIG. 1, all of the detecting units 120 are the light transceivers, or part of the detecting units 120 are the light emitting units and part of the detecting units 120 are the light receiving units. The present disclosure is not limited in this regard.

In some embodiments, the detecting area 140 is a display panel for displaying various images or control interfaces to allow users perform the touch operations. The control unit 160 is coupled to the detecting units 120, so as to control the detecting units 120 to sequentially emit detecting lights and to detect shading points according to a transmission status of each of the scan lines LN. In various embodiments, the control unit 160 is able to control the detecting units 120 via a wired or wireless connection. It is noted that, in FIG. 1, the transmission statuses of the scan lines LN, which are illustrated with solid lines, are normally transmitted, and the transmission statuses of the scan lines LN, which are illustrated with dashed lines, are interrupted.

For example, as shown in FIG. 1, an user performs a touch operation on the detecting area 140, and thus the transmission statuses of the two scan lines LN are interrupted. Accordingly, the control unit 160 detects that the shading points A1 and A2 are present on the detecting area 140, and thus output touch points. However, since a ghost point G1 and a ghost point G2 are formed at crossing points of the two scan lines LN of which the transmission statuses are interrupted, the control unit 160 could mistake the ghost point G1 and the ghost point G2 as being generated from user's touch operation. As a result, an error operation is caused. To improve such problem, in various embodiments, the control unit 160 utilizes the scan lines LN to delete the ghost points G1 and G2, so as to output the correct touch points.

In general, whenever a user performs the touch operation, the shading points are present between the scan lines LN. Therefore, for simplicity illustrations, in this document, the term "shading point" and the term "crossing point" are all referred to as sensing points that interrupts the transmission statuses of the scan lines LN during a user performs the touch operation. Thus, in the drawings of this document, the shading points and the crossing points are illustrated in the same way. Person skilled in the art is able to understand that the shading points and the crossing points are obtained by determining whether the transmission statuses of the scan lines LN are interrupted. In other words, the shading points and the crossing points are essentially able to sense the position of the touch operation.

The following paragraphs provide certain embodiments related to touch system 100 to illustrate functions and applications thereof. However, the present disclosure is not limited to the following embodiments.

Figure 2:
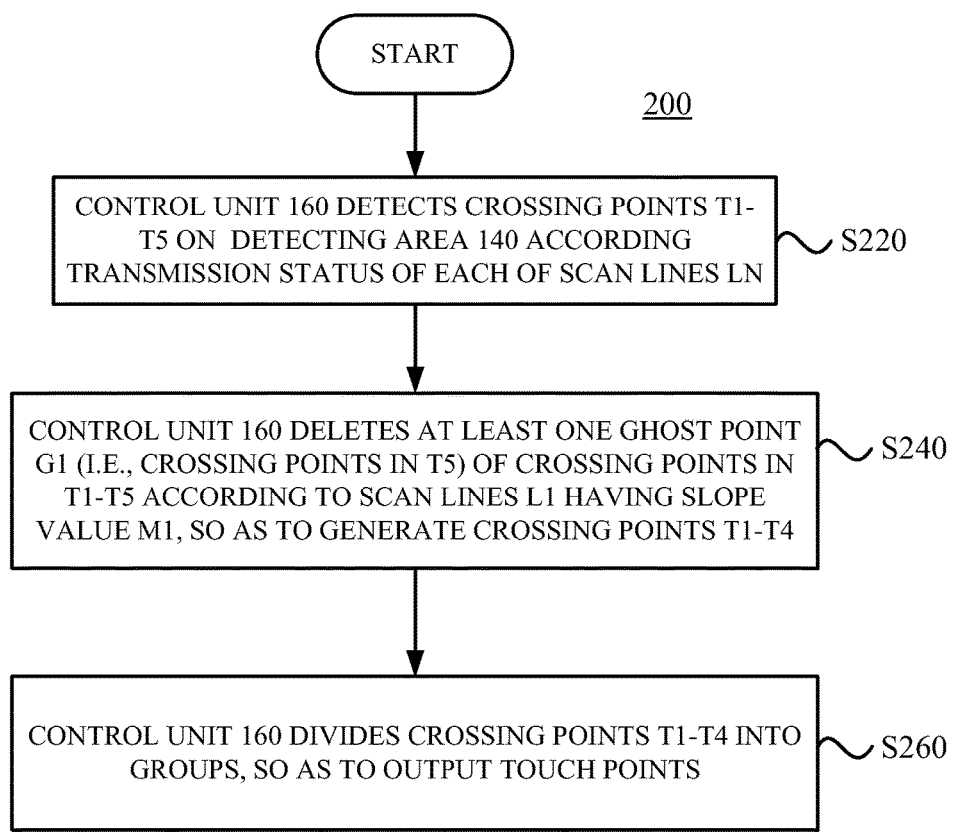
FIG. 2 is a flowchart of a touch detection method according to one embodiment of the present disclosure.
Figure 3:
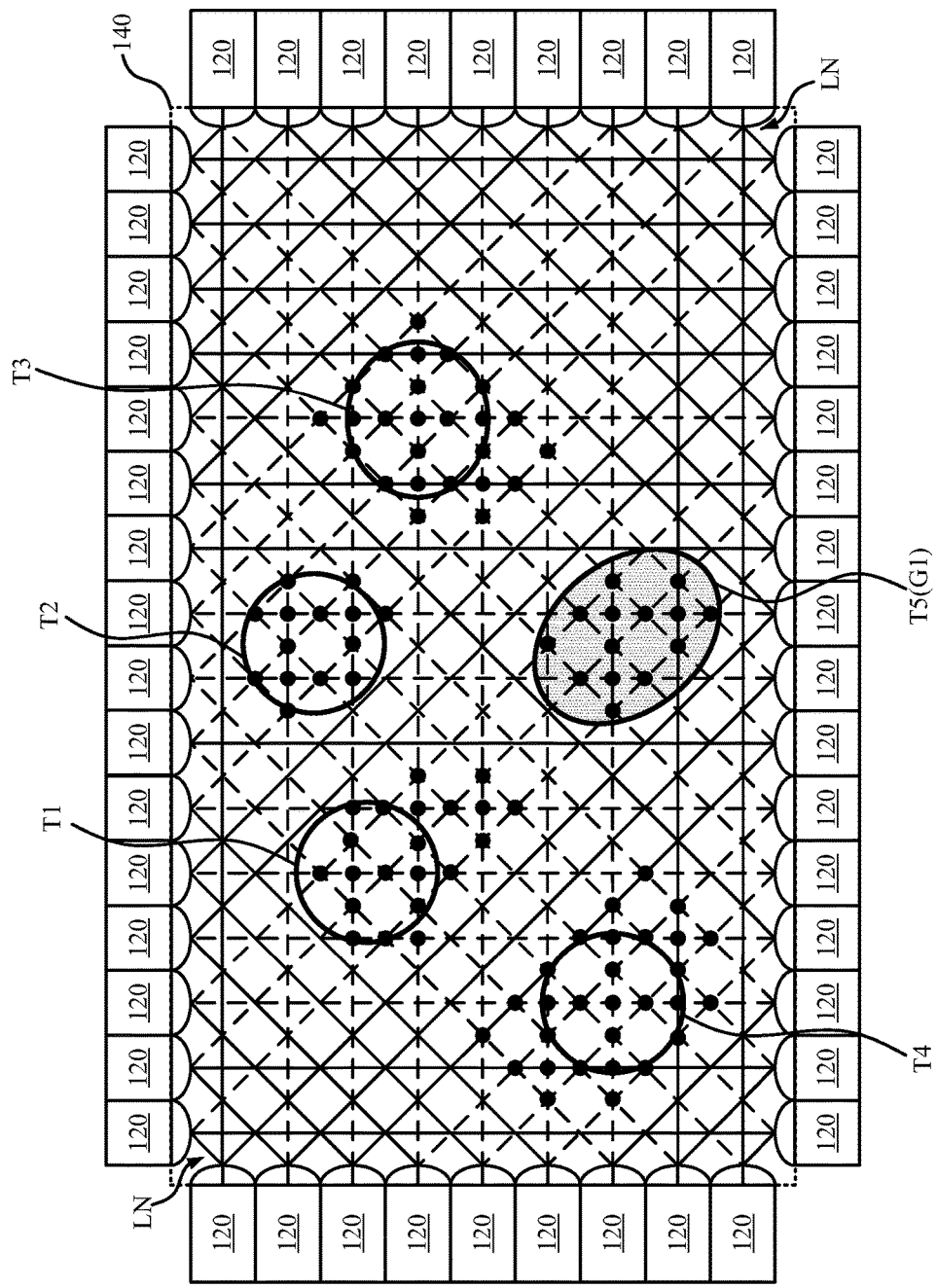
FIG. 3 is a schematic diagram illustrating the touch operation being performed on the detecting area in FIG. 1 according to one embodiment of the present disclosure.

FIG. 2 is a flowchart of a touch detection method according to one embodiment of the present disclosure. FIG. 3 is a schematic diagram illustrating the touch operation being performed on the detecting area in FIG. 1 according to one embodiment of the present disclosure. Reference is now made to FIG. 1, FIG. 2, and FIG. 3, and the operations of the touch system 100 are described with reference to the touch detection method 200.

As shown in FIG. 2, the touch detection method 200 includes step S220, step S240, and step S260. In step S220, the control unit 160 detects the crossing points T1-T5 on the detecting area 140 according the transmission status of each of the scan lines LN.

For example, as shown in FIG. 3, the control unit 160 controls the detecting unit 120 sequentially emit the detecting lights with a direction of approximately 90 degrees, and then controls the detecting unit 120 sequentially emit the detecting lights with a direction of approximately 45 degrees. As a result, the control unit 160 is able to detect the crossing points T1-T5 generated from the touch operation according to the transmission status of each of the scan lines LN having a predetermined slope value being 90 degrees and the transmission status of each of the scan lines LN having a predetermined slope value being 45 degrees.

Taking the crossing point T1 as an example, when the user performs the touch operation, the transmission statuses of the scan lines LN, corresponding to the area of the crossing point T1, are interrupted, the control unit 160 accordingly detects that the touch operation is performed at the position of the crossing point T1. Through the repetitious operations, the position of the crossing points T2-T4, where the touch operation is performed at, are also detected by the control unit 160. Further, as mentioned above, as the transmission status of the scan lines at the area of the crossing point T5, which is referred to as a ghost point G1 hereinafter, are also interrupted, the control unit 160 tentatively determines that the touch operation is performed at the position of the area of the ghost point G1.

In step S240, the control unit 160 deletes at least one ghost point G1 (i.e., the crossing points in T5) of the crossing points in T1-T5 according to the scan lines L1 having the slope value m1, so as to generate the crossing points T1-T4.

Figure 4A:
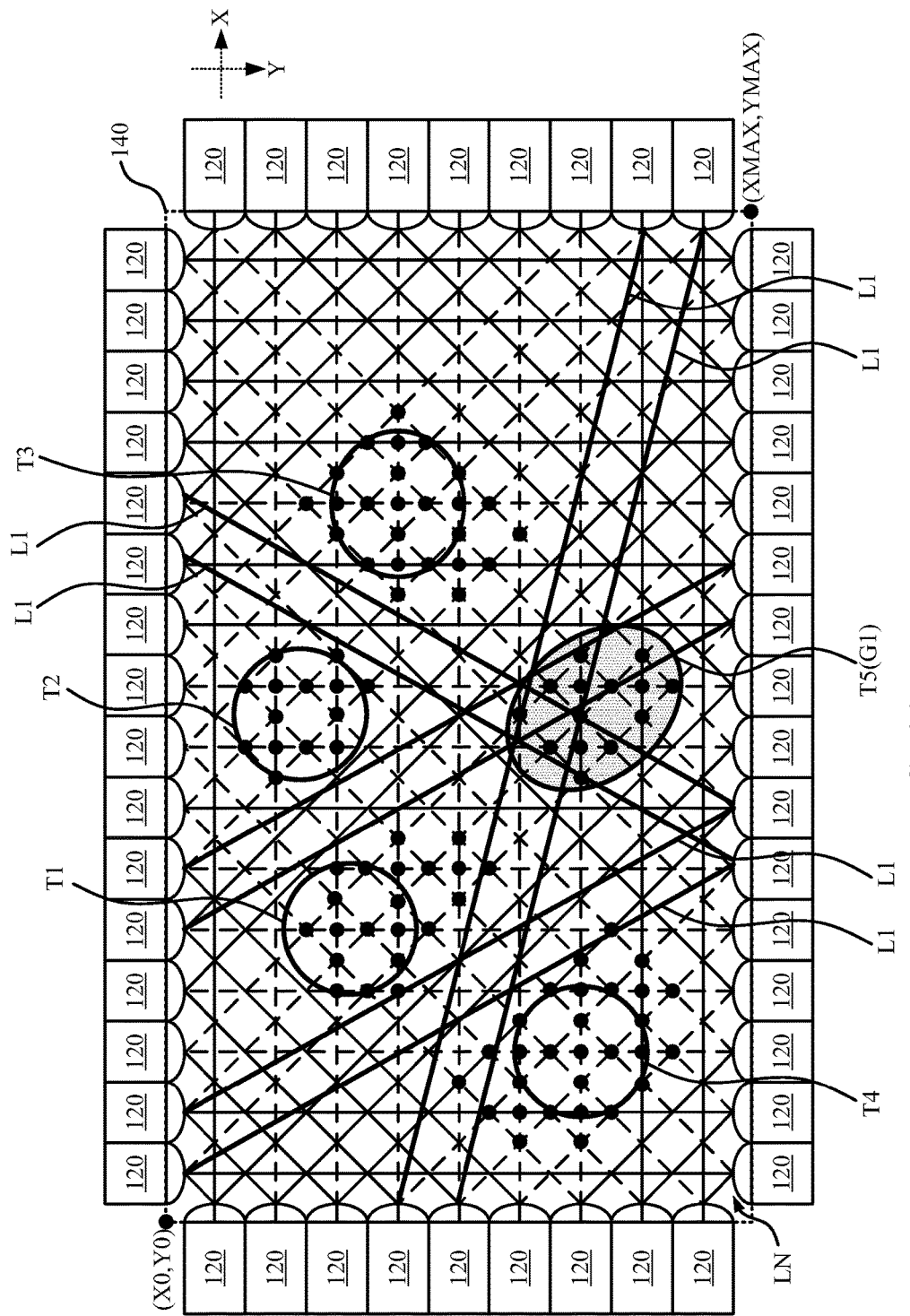
FIG. 4A is a schematic diagram illustrating operation of deleting the ghost points on the detecting area in FIG. 3, according to one embodiment of the present disclosure.

Reference is now made to FIG. 4A. FIG. 4A is a schematic diagram illustrating operation of deleting the ghost points on the detecting area in FIG. 3, according to one embodiment of the present disclosure.

For example, as shown in FIG. 4A, the detecting area 140 is configured to have coordinates with its horizontal direction (i.e., X-axis), and its vertical direction (i.e., Y-axis), in which (X0, Y0) is origin of coordinates, and (XMAX, YMAX) is maximum one of coordinates. Thus, the control unit 160 is able to project the coordinates of the crossing points T1-T5 to one side of the detecting area 140, so as generate new coordinates for each of the crossing points T1-T5. The control unit 160 is able to determine whether any one of the crossing points in T1-T5 is the ghost point with two scan lines L1 having the slope value m1.

FIG. 4B to FIG. 4E are schematic diagrams illustrating operation of deleting ghost point on the detecting area in FIG. 4A, according to one embodiment of the present disclosure.

For simplicity, reference is now made to FIG. 4B, and the following description is illustrated with reference to one shading point of the crossing point T5. For example, the coordinate of the shading point in the crossing point T5 is (X, Y), and the control unit 160 projects the shading point (X, Y) to the X-axis under the detecting area 140 along a direction having the slope value m1, so as to generate a new coordinate (XC1, YMAX), in which the slope value M1 can be derived as follows:

$$m1 = \frac{YMAX - Y}{XC1 - X}$$

In addition, the control unit 160 is able to generate the new coordinate (XC1, YMAX) with the equation above, in which YMAX is the maximum coordinate of the vertical direction of the detecting area 140, and XC1 is the sub-coordinate value of the horizontal direction of the new coordinate (XC1, YMAX), which can be derived from the following equation:

$$XC1 = X + \frac{YMAX - Y}{m1}$$

Figure 4B:
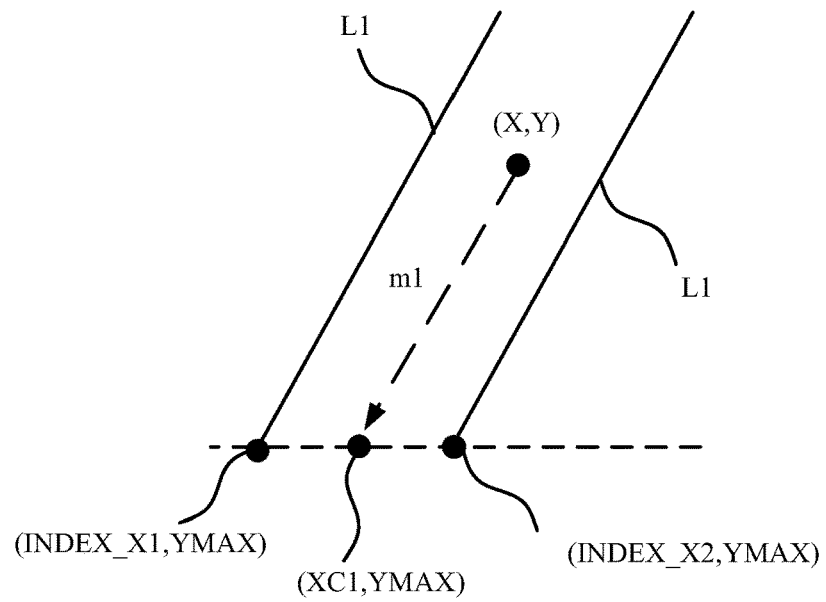
FIG. 4B to FIG. 4E are schematic diagrams illustrating operation of deleting ghost point on the detecting area in FIG. 4A, according to one embodiment of the present disclosure.

Therefore, as shown in FIG. 4B, the control unit 160 is able to determine whether the shading point (X, Y) of the crossing point T5 is ghost point according to the transmission statuses of the two scan lines L1 having the slope value m1 and the new coordinate (XC1, YMAX).

Explained in a different way, the control unit 160 is able to control only two adjacent detecting units 120 to emit two adjacent scan lines L1 having the slope value m1, in which the slope value m1 is different from the predetermined slope value (e.g., 45 or 90 degrees). As a result, the control unit 160 is able to form a detecting path between two adjacent scan lines L1, and such detecting path is configured to pass through the position of the shading point (X, Y). When the transmission statuses of the two adjacent scan lines L1 are not interrupted, it is indicated that the shading point (X, Y) is the ghost point mistook by the control unit 160. Thus, the control unit 160 is able to delete this shading point (X, Y).

In this example, the control unit 160 generates an index value INDEX_X1 and an index value INDEX_X2, and determines the aforementioned two adjacent scan lines L1 according to the slope value m1, the index value INDEX_X1, and the index value INDEX_X2. The index value INDEX_X1 is a maximum integer less than the sub-coordinate XC1, and the index value INDEX_X2 is a minimum integer greater than the sub-coordinate XC1. The index value INDEX_X1 and the index value INDEX_X2 can be expressed as follows:

INDEX_X1=⌊XC1⌋;

INDEX_X2=INDEX_X1+1

As shown in FIG. 4B, the index value INDEX_X1 and the index value INDEX_X2 are sub-coordinate values of the two adjacent scan lines L1, respectively. In other words, the two adjacent scan lines L1 and an axis-line corresponding to the sub-coordinate YMAX are intersected at the coordinate (INDEX_X1, YMAX).

In some embodiments, in step S220, the control unit 160 controls the detecting unit 120 to pre-generate the scan lines LN having various slope values at the same time, and records the transmission status of the each of the scan lines LN. As a result, after the corresponding two scan lines L1 are determined, the control unit 160 can directly search the transmission statuses of the two scan lines L1, so as to determine whether the ghost point is required to be deleted. Through such arrangement, the operation efficiency of outputting the touch points of the control unit 160 can be increased.

Alternatively, in some other embodiments, the control unit 160 determines the corresponding two scan line L1, and then controls the corresponding detecting units 120 to emit the light to obtain the transmission statuses of the corresponding two scan lines L1, so as to determine whether the ghost point is required to be deleted. Through such arrangement, the transmission bandwidth of the control unit 160 and the hardware cost can be reduced.

Figure 4C:
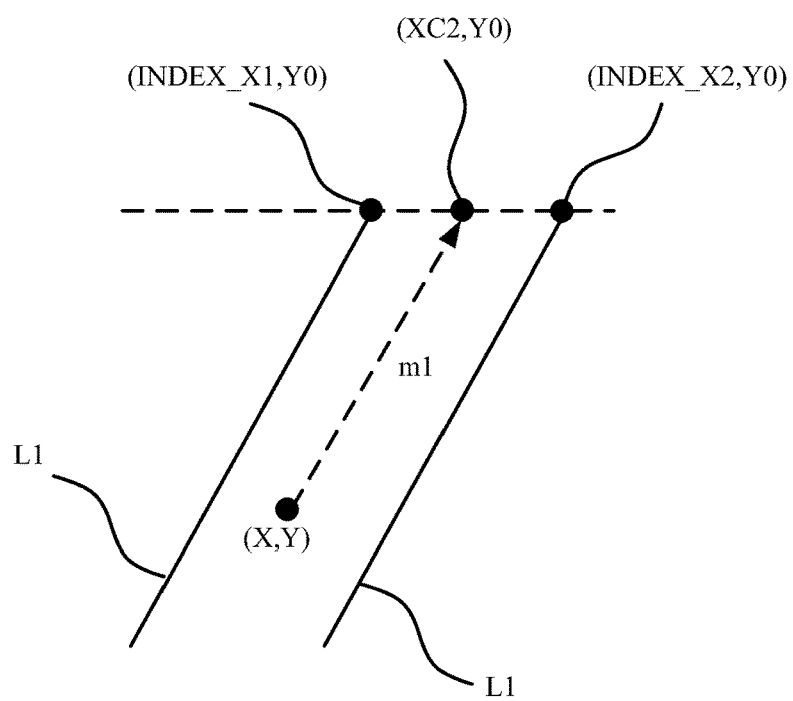
Figure 4D:
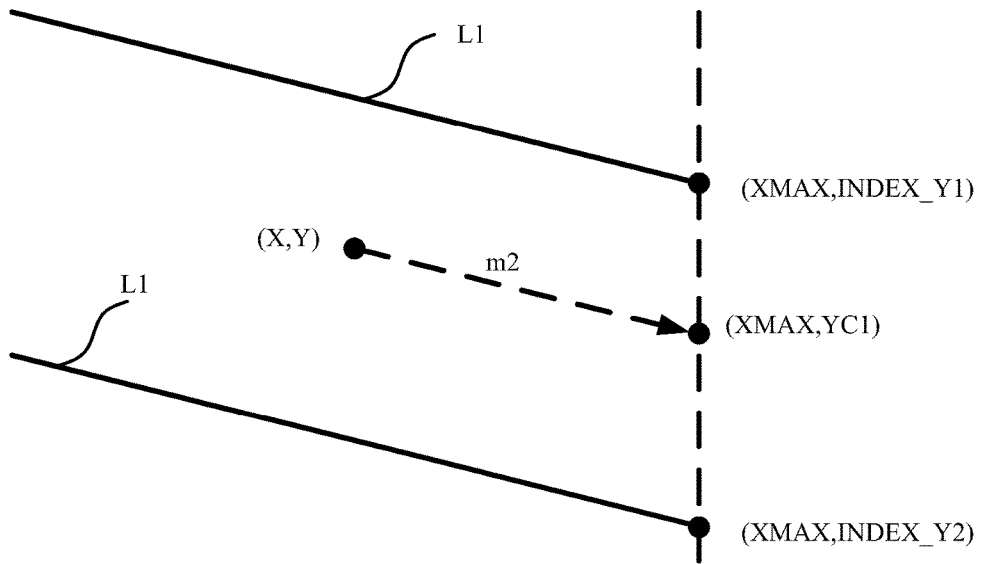
Figure 4E:
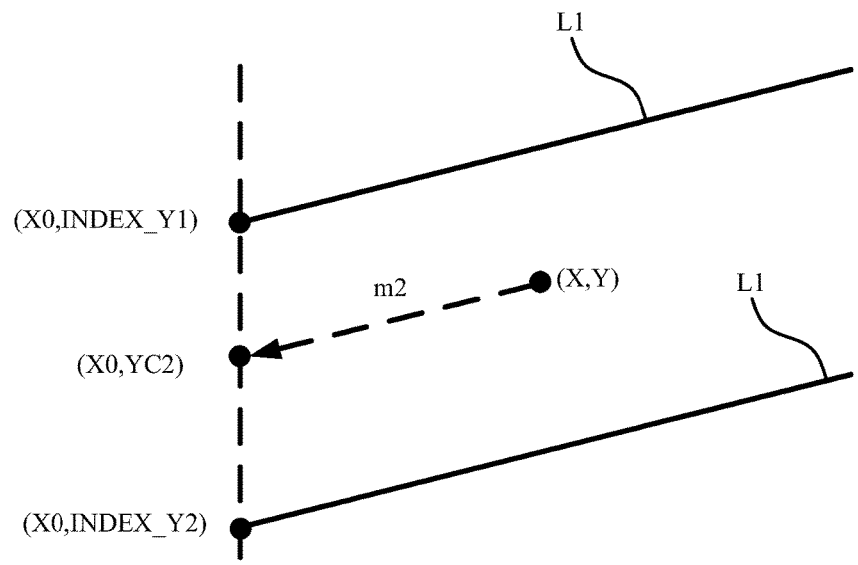

Moreover, FIG. 4C, FIG. 4D, and FIG. 4E illustrate various embodiments, in which the control unit 160 projects the shading point (X, Y) to different sides of the detecting area 140 along different directions. Table 1 shows the calculation equations corresponding to the FIG. 4C, FIG. 4D, and FIG. 4E, the related calculations and the operations are similar with the aforementioned embodiment, and thus the repetitious descriptions are not going further in this regard.

TABLE 1

| FIG. | Calculation Equations |
|---|---|
| FIG. 4C | $XC1 = X + \frac{Y0 - Y}{m1}$; |
| FIG. 4D | INDEX_X1 = ⌊XC2⌋;<br>INDEX_X2 = INDEX_X1 + 1<br>YC1 = Y + m2(XMAX − X);<br>INDEX_Y1 = ⌊YC1⌋;<br>INDEX_Y2 = INDEX_Y1 + 1 |
| FIG. 4E | YC2 = Y +m2(X0 − X);<br>INDEX_Y1 = ⌊YC2⌋;<br>INDEX_Y2 = INDEX_Y1 + 1 |

Figure 5A:
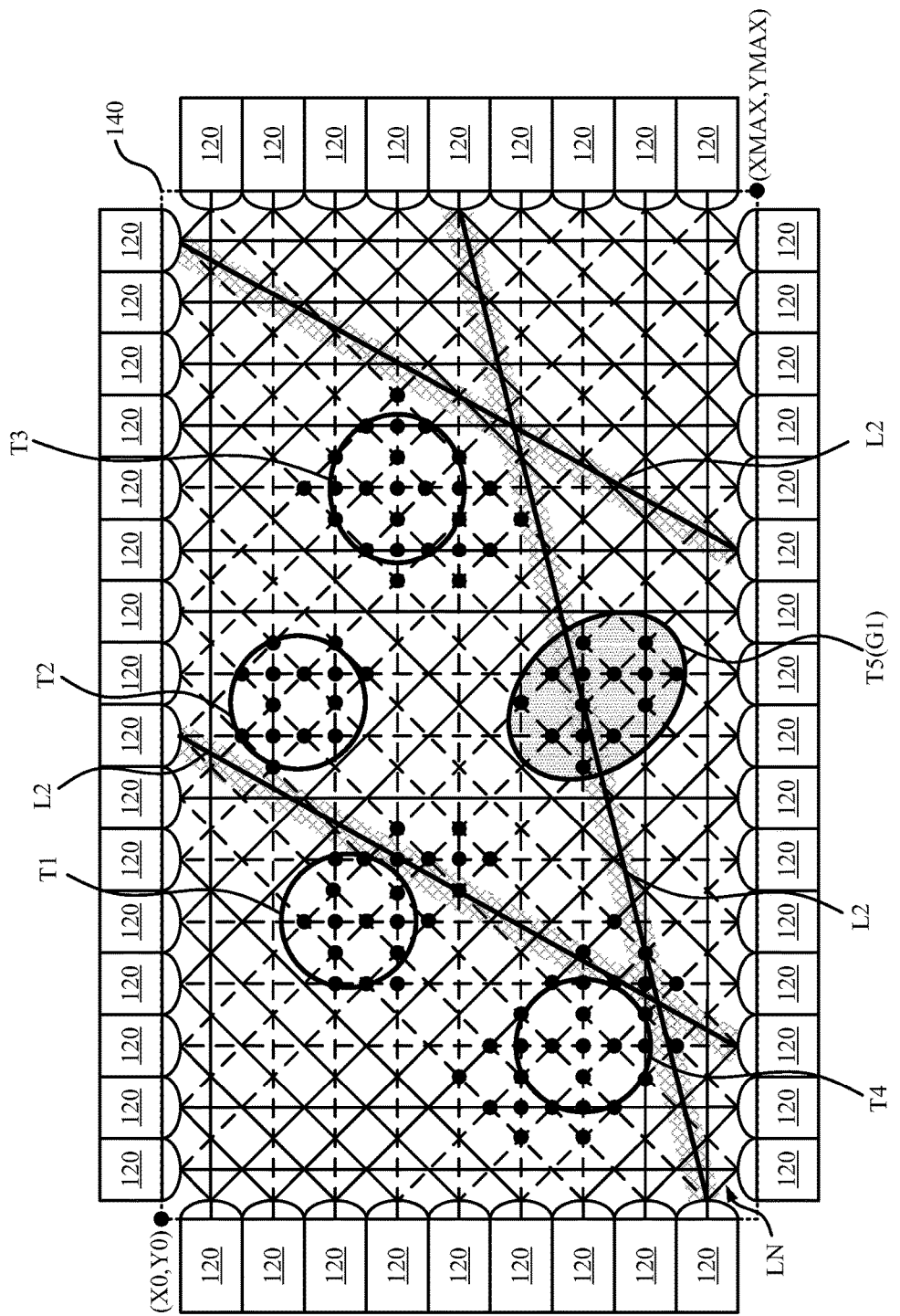
FIG. 5A is a schematic diagram illustrating operation of deleting the ghost point on the detecting area in FIG. 4A, according to one embodiment of the present disclosure.

Reference is now made to FIG. 5A. FIG. 5A is a schematic diagram illustrating operation of deleting the ghost point on the detecting area in FIG. 4A, according to one embodiment of the present disclosure.

In certain circumstances, when the positions of the crossing points T1-T5 are too close with each other, the control unit 160 would hardly utilize two adjacent scan lines L1 to delete ghost points. Under this condition, as shown in FIG. 5A, the control unit 160 further utilizes a single scan line L2 and a predetermined threshold value d to delete the ghost points.

FIG. 5B-5E are schematic diagrams illustrating operations of deleting the ghost points on the detecting are in FIG. 5A and improving the accuracy of the central point, according to one embodiment of the present disclosure.

For simplicity, reference is now made to FIG. 5B, the following description are also illustratively described with reference to one shading point in the crossing point T5. Similarly, the control unit 160 is able to utilizes the above calculations to project the shading point (X, Y) to the X-axis under the detecting area 140 along the direction having the slope value m3, so as to generate a new coordinate (XC1, YMAX). Similarly, in this embodiment, the control unit 160 is also able to determine the scan line L2 having the slope value m1 and the sub-coordinate value XC1 with the aforementioned calculations.

In other words, in this embodiment, the control unit 160 only controls a single detecting unit 120 to emit the detecting light at one time, so as to generate the scan line L2 having the slope value m3. As a result, the control unit 160 is able to determine whether the ghost point is presented in the crossing points T1-T5 according to the scan line L2, a predetermine threshold value d and new coordinate (XC1, YMAX).

Figure 5B:
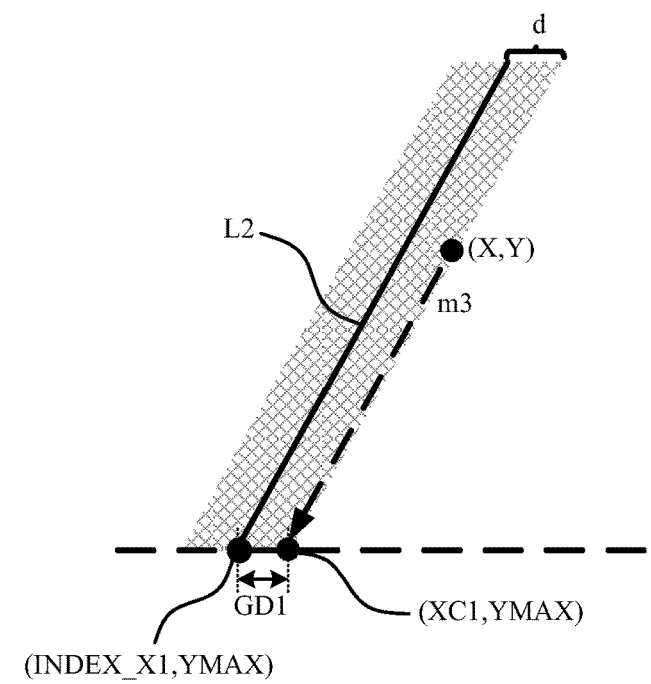
FIG. 5B-5E are schematic diagrams illustrating operations of deleting the ghost points on the detecting are in FIG. 5A and improving the accuracy of the central point, according to one embodiment of the present disclosure.

In greater detail, as shown in FIG. 5B, when the transmission status of the scan line L2 is not interrupted, and a distance GD1 between the scan line L2 and the new coordinated (XC1, YMAX) is less than the predetermine threshold value d, the control unit 160 determines that the shading point (X, Y) is the ghost point, and thus deletes it. The distance GD1 is derived as follows:

$$GD1 = |XC1 - INDEX\_X1|$$

Explained in a different way, in this embodiment, the control unit 160 utilizes one scan line L2 and the predetermined threshold value d to form the detecting path. If the shading point (X, Y) falls within this detecting path, it indicates that the shading point (X, Y) is the ghost point mistook by the control unit 160 previously. Thus, the control unit 160 is able to delete the shading point (X, Y). Through repetitious operations above, the control unit 160 is able to determine that the crossing point T5 is the ghost point, and to keep the crossing points T1-T4.

Figure 5C:
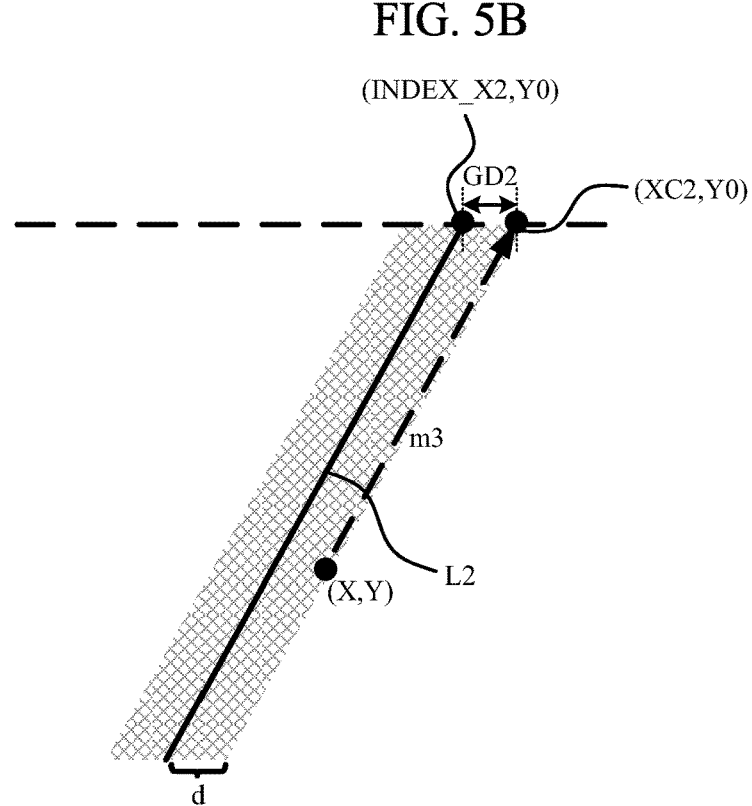
Figure 5D:
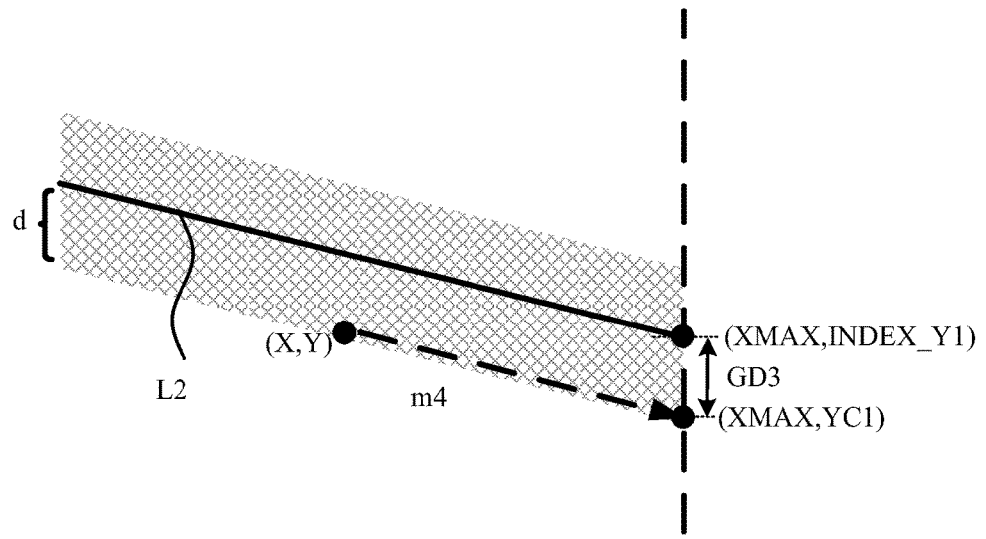
Figure 5E:
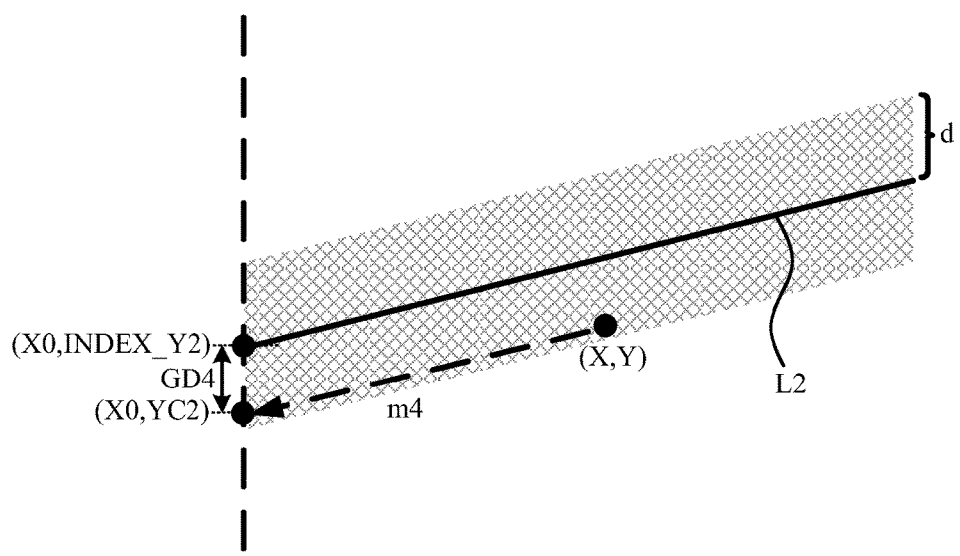

Similarly, FIG. 5C, FIG. 5D, and FIG. 5E illustrate various embodiments of detecting the ghost points with a single scan line L2, in which the control unit 160 projects the shading point (X, Y) to different sides of the detecting area 140 along different directions. Table 2 shows the calculation equations corresponding to the FIG. 5C, FIG. 5D, and FIG. 5E, the related calculations and the operations are similar with the aforementioned embodiment, and thus the repetitious descriptions are not going further in this regard.

TABLE 2

| FIG. | Calculation Equations |
|---|---|
| FIG. 5C | $XC2 = X + \dfrac{YMAX - Y}{m3}$; |
| | INDEX_X1 = ⌊XC2⌋; |
| | GD2 = \|XC2 - INDEX_X2\| |
| FIG. 5D | YC1 = Y + m4(XMAX - X); |
| | INDEX_Y1 = ⌊YC1⌋; |
| | GD3 = \|YC1 - INDEX_Y1\| |
| FIG. 5E | YC2 = Y + m4(X0 - X); |
| | INDEX_Y1 = ⌊YC2⌋; |
| | GD4 = \|YC2 - INDEX_Y1\| |

By using the single one scan line L2, the control unit 160 is able to delete more ghost points to improve the accuracy of the touch operation. In some embodiments, the control unit 160 is able to delete the ghost points only through the operations illustrated in FIG. 4A to FIG. 4E. Alternatively, in some other embodiments, the control unit 160 is able to delete the ghost points only through the operations illustrated in FIG. 5A to FIG. 5E. In yet some embodiments, the control unit 160 is able to delete the ghost points through the operations illustrated in FIG. 4A to FIG. 4E at first, then to delete the remaining ghost points through the operations illustrated in FIG. 5A to FIG. 5E. In other words, person skilled in the art is able to determine the actual operations of the deleting the ghost points of the control unit 160 according to actual requirements (e.g., accuracy of the touching operation, processing time, etc). Therefore, various operations above and the combination thereof are within the contemplated scope of the present disclosure.

With continued reference FIG. 2, in step S260, the control unit 160 divides the crossing points T1-T4 into groups, so as to output the touch points.

Figure 6:
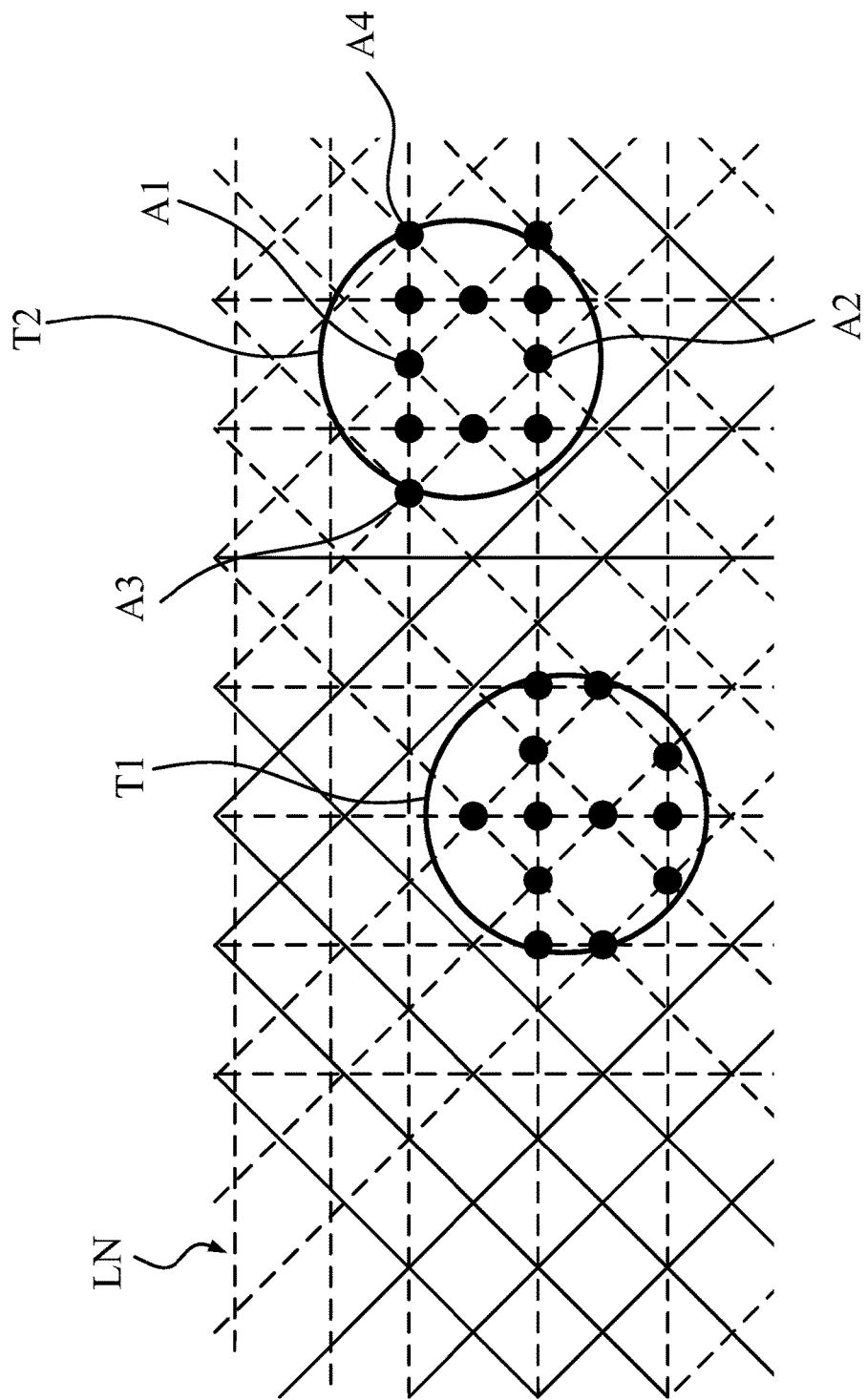
FIG. 6 is a schematic diagram illustrating operations of diving the crossing point T1 and the crossing point T2 into groups, according to one embodiment of the present disclosure.

For example, reference is now made to FIG. 6. FIG. 6 is a schematic diagram illustrating operations of diving the crossing point T1 and the crossing point T2 into groups, according to one embodiment of the present disclosure.

As shown in FIG. 6, in this example, when the control unit 160 detects the transmission statuses of the each scan lines LN, the control unit 160 is able to record the corresponding positions of the shading points at the detecting area 140. Thus, the control unit 160 is able to divide the shading points connected and being adjacent to each other into a same group (i.e., considered them as the same crossing point T2), and to determine an area and a central point of this group according to a highest shading point A1 and a lowest shading point A2 in the vertical direction (i.e., the direction of Y-axis), and a far left shading point A3 and a far right shading point A4 in the horizontal direction (i.e., the direction of X-axis), so as to be output as the touch points.

Explained in a different way, the control unit 160 is able to form the crossing points T1-T4 by dividing the shading points into groups, and to calculate the area and the central point of the corresponding crossing points T1-T4 to output the touch points, so as to perform the touch operation. As mentioned above, since whenever user performs the touch operation, the shading points are generated at a same time. With such arrangement, the control unit 160 is able to further determine the actual touch points corresponding to the touch operation from the user, so as to achieve the more accurate touch operation.

In some embodiments, the control unit 160 controls all of the detecting units 120 to generate the detecting lights, then deletes the ghost points (i.e., step S240) and generates the touch points (i.e., step S260).

Alternatively, in some other embodiments, the control unit 160 is able to sequentially control the detecting units 120 to generate the detecting lights, and to delete the ghost points (i.e., step S240) and generate the touch points (i.e., step S260). For illustration, the control unit 160 sequentially controls the detecting units 120 to form the scan lines LN along the horizontal direction of the detecting area 140. When transmitting the second scan line LN, the control unit 160 deletes the ghost points according to shading points detected by the first scan line LN at the same time. Thus, with similar operations, the control unit 160 is able to complete outputting the touch points in a shorter process time. Therefore, the operational efficiency of the touch system 100 is improved.

In various embodiments, the control unit 160 is a design tool carried on a non-transitory computer-readable medium storing the touch detection method 200. In other words, the control unit 160 is implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized.

In summary, the touch system and the touch detection method of the present disclosure are able to have multiple arrangements, and to significantly improve the accuracy of the touch operation by deleting ghost points.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch system, comprising:
 a plurality of detecting units disposed around a detecting area, wherein the detecting units form a plurality of scan lines therebetween; and
 a control unit configured to detect a plurality of first crossing points according to a transmission status of each of the scan lines, to delete a plurality of ghost points of the first crossing points according to a first scan line having a first slope value of the scan lines to generate a plurality of second crossing points, and to divide the second crossing points into groups to output a plurality of touch points;

wherein the control unit is configured to project a first coordinate of a first one of the first crossing points to one side of the detecting area according to the first slope value to generate a second coordinate, and to determine whether the first one of the first crossing points is one of the ghost points according to the second coordinate, the transmission status of the first scan line, and the transmission status of a second scan line having the first slope value of the scan line.

2. The touch system of claim 1, wherein the control unit is configured to detect the first crossing points according to the transmission statuses of the scan lines having a first predetermined slope value and the transmission statuses of the scan lines having a second predetermined slope value, and the first slope value, the first predetermined slope value, and the second predetermined slope value are different.

3. The touch system of claim 1, wherein when the transmission status of the first scan line is not interrupted, and the transmission status of the second scan line is not interrupted, the control unit determines that the first one of the first crossing points is one of the ghost points.

4. The touch system of claim 1, wherein the control unit is further configured to generate a first index value and a second index value according to a sub-coordinate value of the second coordinate, and to determine the first scan line and the second scan line according to the first slope value, the first index value, and the second index value, wherein the first index value is a maximum integer that is less than the sub-coordinate value, and the second index value is a minimum integer that is greater than the sub-coordinate value.

5. The touch system of claim 1, wherein the control unit is further configured to project the first coordinate of a second one of the first crossing points to one side of the detecting area according to a second slope value to generate a third coordinate, and to determine whether the second one of the first crossing points is one of the ghost points according to the third coordinate, a predetermined threshold value, and the transmission status of a third scan line having the second slope value of the scan lines.

6. The touch system of claim 5, wherein when the transmission status of the third scan line is not interrupted, and a distance between the third coordinate and the third scan line is less than the predetermined threshold value, the control unit determines that the second one of the first crossing points is one of the ghost points.

7. The touch system of claim 5, wherein the control unit is further configured to generate a second index value according to a sub-coordinate value of the third coordinate, and to determine the third scan line according to the second slope value and the second index value, wherein the second index value is a maximum integer that is less than the sub-coordinate value of the third coordinate.

8. The touch system of claim 1, wherein the control unit is configured to project a first coordinate of a first one of the first crossing points to one side of the detecting area according to the first slope value to generate a second coordinate, and to determine whether the first one of the first crossing points is one of the ghost points according to the second coordinate, a predetermined threshold value, and the transmission status of the first scan line.

9. The touch system of claim 1, wherein the control unit is configured to determine an area and a central point of the groups according to a highest one and a lowest one of the second crossing points of the group in a vertical direction along a plane of the detecting area and a highest one and a lowest one of the second crossing points of the group in a horizontal direction along the plane of the detecting area, so as to output the touch points.

10. A touch detection method, comprising:
detecting a plurality of first crossing points on a detecting area according to a transmission status of each of a plurality of scan lines;
deleting a plurality of ghost points of the first crossing points according to a first scan line having a first slope value of the scan lines, so as to generate a plurality of second crossing points; and
dividing the second crossing points into groups, so as to output a plurality of touch points;
wherein the step of generating the second crossing points comprises:
projecting a first coordinate of a first one of the first crossing points to a side of the detecting area according to the first slope value to generate a second coordinate; and
determining whether the first one of the first crossing points is one of the ghost points according to the second coordinate, the transmission status of the first scan line, and the transmission status of a second scan line having the first slope value of the scan lines.

11. The touch detection method of claim 10, wherein the step of detecting the first crossing points comprises:
detecting the first crossing points according to the transmission status of the scan lines having a first predetermined slope value and a second predetermined slope value, and the first slope value, the first predetermined slope value, and the second predetermined slope value are different.

12. The touch detection method of claim 10, wherein when the transmission status of the first scan line is not interrupted, and the transmission status of the second scan line is not interrupted, the first one of the first crossing points is determined to be one of the ghost points.

13. The touch detection method of claim 10, wherein the step of generating the second crossing points further comprises:
generating a first index value and a second index value according to a sub-coordinate value of the second coordinate, wherein the first index value is a maximum integer that is less than the sub-coordinate value, and the second index value is a minimum integer that is greater than the sub-coordinate value; and
determining the first scan line and the second scan line according to the first slope value, the first index value, and the second index value.

14. The touch detection method of claim 10, wherein the step of generating the second crossing points further comprises:
projecting the first coordinate of a second one of the first crossing points to one side of the detecting area according to a second slope value, so as to generate a third coordinate; and
determining whether the second one of the first crossing points is one of the ghost points according to the third coordinate, a predetermined threshold value, and the transmission status of a third scan line having the second slope value of the scan lines.

15. The touch detection method of claim 14, wherein when the transmission status of the third scan line is not interrupted, and the distance between the third coordinate and the third scan line is less than the predetermined threshold value, the second one of the first crossing points is determined to be one of the ghost points.

16. The touch detection method of claim 14, wherein the step of generating the second crossing points further comprises:
   generating a first index value according to a sub-coordinate value of the third coordinate, wherein the first index value is a maximum integer that is less than the sub-coordinate value of the third coordinate; and
   determining the third scan line according to the second slope value and the first index value.

17. The touch detection method of claim 10, wherein the step of generating the second crossing points comprises:
   projecting a first coordinate of a first one of the first crossing points to a side of the detecting area according to the first slope value, so as to generate a second coordinate; and
   determining whether the first one of the first crossing points is one of the ghost points according to the second coordinate, a predetermined threshold value, and transmission status of a first scan line having the first slope value of the scan lines.

18. The touch detection method of claim 10, wherein the step of outputting the touch points comprises:
   dividing the second crossing points into groups; and
   determining an area and a central point of the groups according to a highest one and a lowest one of the second crossing points of the group in a vertical direction along a plane of the detecting area and a highest one and a lowest one of the second crossing points of the group in a horizontal direction along the plane of the detecting area, so as to output the touch points.

* * * * *